United States Patent Office 3,450,889
Patented June 17, 1969

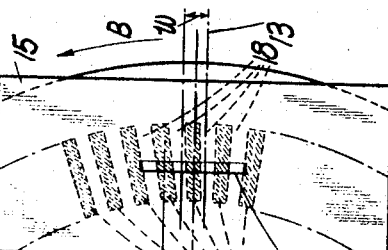
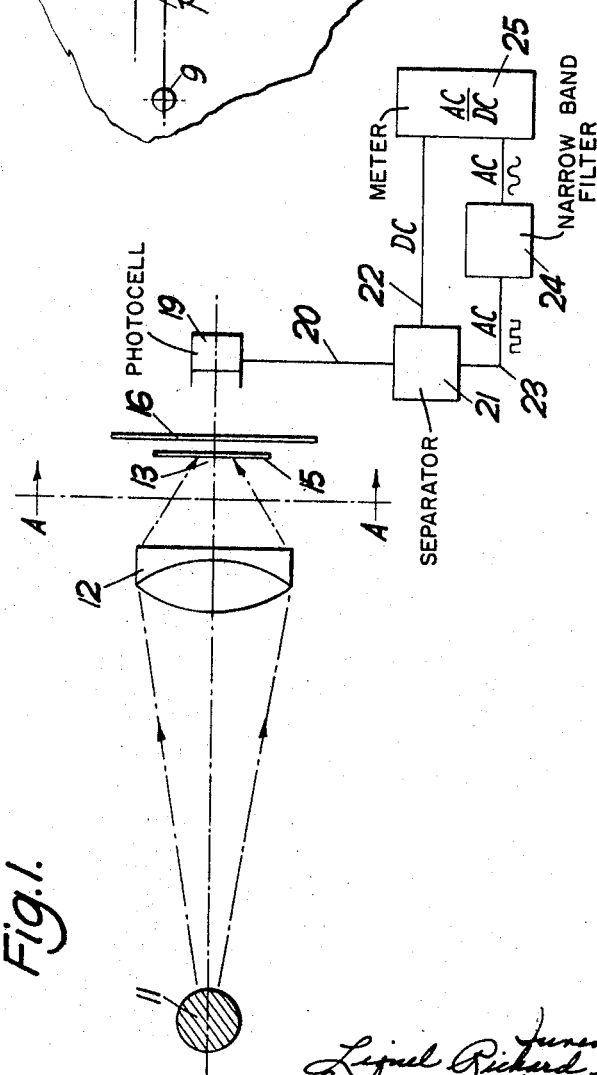

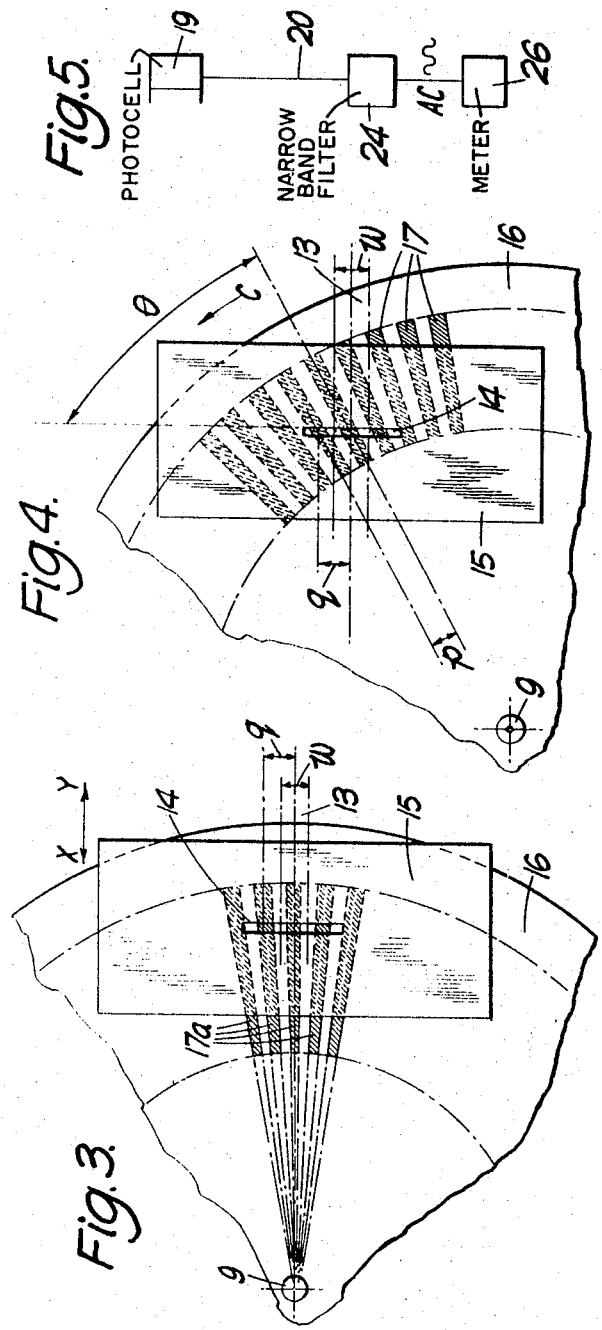

3,450,889
RADIATION SENSITIVE APPARATUS FOR MEASURING LINEAR DIMENSIONS
Lionel Richard Baker, Chislehurst, Kent, England, assignor to British Scientific Instrument Research Association, Chislehurst, Kent, England, a British company
Filed Feb. 1, 1966, Ser. No. 524,339
Claims priority, application Great Britain, Feb. 8, 1965, 5,471/65
Int. Cl. G01n 21/30
U.S. Cl. 250—219      10 Claims

ABSTRACT OF THE DISCLOSURE

Apparatus for measuring a linear dimension of an object which emits, absorbs, transmits, partly screens or reflects radiation. An image of the dimension is formed on a slit and the image scanned by the lines of a radial grating. The grating modulates the beam with the degree of modulation depending upon the relationship between the spatial frequency of the grating lines in the direction of the said dimension and the width of the image. This relationship can be adjusted by adjusting the relative positions of the axis of the rotation of the grating and the image in a direction at right-angles to the axis, either by moving the axis and the image towards and away from each other or by rotating one to a limited extent about the other. In practice this adjustment is preferably carried out until the degree of modulation is zero or a minimum value which occurs when the spatial frequency and the linear dimension of the image are equal so enabling the linear dimension of the object to be measured.

*Disclosure*

The invention relates to apparatus for measuring linear dimensions.

The invention provides, in one of its aspects, apparatus for measuring a linear dimension of an object which emits, transmits, or reflects radiation, which apparatus includes means respective to the radiation from the object for producing a modulated electrical signal, the degree of modulation of which provides a measure of the said linear dimension, and means for measuring the degree of modulation and thereby the said linear dimension.

Preferably the means responsive to the radiation and for producing a modulated electrical signal includes scanning means for scanning an image of the object and providing an output signal as the image is scanned which scanning means includes a number of regions with differing responses to the said radiation thereby to modulate the said output signal.

The invention provides, in another of its aspects apparatus for measuring a linear dimension of an object which emits, transmits, or reflects radiation, which apparatus includes means for forming an image of the object, scanning means for scanning the image by movement relative to the image in a direction in which the linear dimension is to be measured, which scanning means is sub-divided in the said direction into a number of first and second regions alternately which are arranged to respond differently from each other to the radiation incident upon them from the said image, electrical signal generating means arranged to provide an electrical signal representing the response of the first and second regions of the scanning means to the radiation incident upon them, and means for measuring the degree of modulation of the said electrical signal and thereby provide a measure of the linear dimension of the object being measured.

Preferably the scanning means comprises a plate in which the said first and second regions transmit, and do not transmit, respectively the radiation incident upon them from the object, and a transducer is arranged to provide an electrical signal in response to the radiation transmitted by the said first regions. Preferably the said first and second regions are all of equal width in the direction in which the linear dimension is to be measured.

Preferably the said image of the object is formed on a radiation transmitting slit which extends in the direction in which the linear dimension is to be measured and the scanning means is moved relative to the slit with the first and second regions passing alternately along the length of the slit.

Preferably the scanning means includes a radial grating in which the said second regions are provided by non-transmitting radial lines on the grating and extending perpendicular to the length of the slit and the first regions are provided by the spaces between the lines on the grating so that by rotation of the grating about its axis, the image is scanned.

Preferably means are provided for varying the spatial frequency of the lines on the grating in a direction along the length of the slit.

Preferably the apparatus may be used for measuring a number of linear dimensions of an object, by the inclusion of separate scanning means each associated with one of the linear dimensions to be measured, and means for filtering from the electrical signal of the electrical signal generating means, electrical signals associated respectively with the separate scanning means and thereby provide a measure of each linear dimension of the object.

The invention provides, in another of its aspects, a method of testing a linear dimension of an object which emits, transmits, or reflects radiation, which method comprises the steps of forming an image of the object scanning the image in a direction in which the linear dimension is to be measured by moving relative to the image scanning image means sub-divided in the direction of movement into a number of first and second regions alternately, the first and second regions being arranged to respond differently from each other to the radiation incident upon them from the said image, and forming an electrical signal representing the response of the said first and second regions to the radiation incident upon them the arrangement being such that a measure of the linear dimension of the object being tested is given by the degree of modulation of the said electrical signal.

The aforesaid apparatus or method may be used to measure a linear dimension of a radiation absorber, in which apparatus or method, the object is a source of radiation partly screened from the said responsive means or the said scanning means by a radiation-absorber which absorbs radiation, the linear dimension measured being a linear dimension of the radiation absorber.

Some specific embodiments of the invention will now be described, by way of example, and with reference to the accompanying drawings in which:

FIGURE 1 shows diagrammatically an apparatus for measuring a linear dimension of an object.

FIGURE 2 is a section of the line A—A in FIGURE 1,

FIGURE 3 shows a modification of the part of the apparatus shown in FIGURE 2.

FIGURE 4 shows a further modification of the part of the apparatus shown in FIGURE 2, and FIGURE 5 shows a modification of the electrical part of the apparatus.

Figure 6:
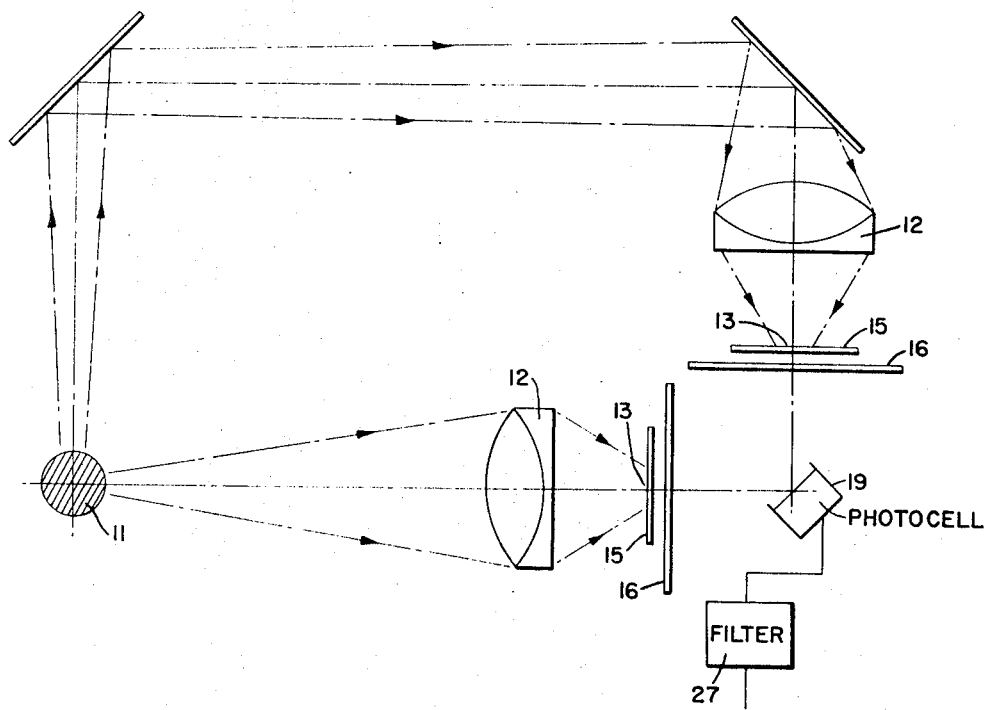

FIGURE 6 diagrammatically shows how the apparatus of FIGURE 3 or FIGURE 4 may be modified to measure two linear dimensions of an object at the same time.

In all these examples, the apparatus is for measuring a linear dimension of an object which emits, transmits or reflects radiation, without making contact with the object, such as for instance, for measuring the diameter of a hot cylindrical rod 11 which emits infra-red or visible radiation.

As is shown in FIGURES 1 and 2 radiation emitted by the rod 11 is passed through a converging lens 12 to form an image 13 on a slit 14 in a plate 15. The slit 14 is elongated and extends along the direction in which the diameter of the rod 11 is to be measured (that is at right angles to the longitudinal axis of the rod 11). The slit 14 transmits radiation but the surrounding plate 15 does not transmit radiation. Immediately adjacent the plate 15 on the side remote from the lens 12 is a radial grating 16. The grating 16 consists of a circular plate rotatably mounted on an axis 9 perpendicular to the plane of the grating 16 and passing through its centre. A number of opaque grating lines 17 (only some of which are shown) substantially parallel to each other and all of equal width, are arranged radially in a circle towards the periphery of the grating 16. A motor (not shown) is provided to rotate the grating 16 so that the lines 17 move continuously and at a constant speed past the slit 14 with each line 17 extending perpendicularly to the length of the slit 14. Between the opaque lines 17 are light transmitting spaces 18 all of equal width and of the same width as the lines 17.

A photo-electrical cell 19 is provided on the side of the grating 16 remote from the lens 12 and arranged to receive radiation from the rod 11 which is transmitted by the slit 14 and grating 16. The photo-electrical cell 19 provides an electrical output signal 20 representing the radiation transmitted by the grating 16. The electric signal 20, which usually consists of a DC component modulated by an AC component, is fed into a separator 21 which separates the AC and DC components. The DC output 22 of the separator 21 is fed direct to a meter 25. The AC ouptut 23 of the separator 21 is passed through a narrow band filter 24 to the meter 25. The meter 25 is arranged to measure the ratio of the amplitude of the alternating current to the amplitude of the direct current and thereby give a measure of the degree of modulation of the electrical output signal 20 of the photo cell 19.

In use of the apparatus shown in FIGURES 1 and 2, the radial grating 16 is rotated about the axis 9 so that the lines 17 move past the slit 14 in the direction of the arrow B. The radiation from the object 11 forms an image of width $w$ on the slit 14. The degree of modulation of the output signal 20 of the photo cell 19 depends on the relative values of the width $w$ of the image 13 and the distance $p$ between the centres of the adjacent lines 17 on the grating 16. If the width $w$ of the image 13 is small compared with $p$ the degree of modulation of the signal 20 tends towards unity. As the width increases the degree of modulation decreases until when $w$ equals $p$ the modulation of the signal 20 becomes zero or nearly zero. As the value of $p$ is known the reading on the meter 25 giving the degree of modulation of the signal 20, provides a measure of the diameter of the rod 11. The grating 16 is chosen so that the value of $p$ is not less than the width of the image 13. In order to obtain a good linearity of the relationship between the degree of modulation of the signal 20 and the width $w$ of the image 13 (and thereby the value of the diameter of the rod 11) the apparatus is arranged so that the value $w$ is larger than $\frac{1}{2}p$ but less than $p$.

In the modification shown in FIGURE 3, the apparatus is generally the same as shown in FIGURES 1 and 2 except that the lines 17a on the grating 16 are longer in length and the grating 16 may be moved relative to the slit 14 along the XY axis. As the lines 17a on the grating 16 are radial lines they are closer together at their ends nearer the xais 9 than they are at their ends near the periphery of the grating 16. Therefore by moving the grating 16 relative to the slit 14 along the axis XY, the spatial frequency of the lines 17a (that is the number of lines 17a in a given length in a direction along the the length of the slit 14) may be altered. The lines 17a shown in FIGURE 3 all subtend equal angles at the centre 9 of the grating 16.

In use of the apparatus shown in FIGURE 3 the grating is rotated about the axis at a constant velocity so that the lines 17 move continuously at a constant speed along the length of the slit 14. The grating is moved in the XY direction to alter the distance between the axis 9 and the slit 14 thereby to alter the spatial frequency and the distance $q$ between the centres of adjacent lines 17a moving across the slit 14. As the value of $q$ is reduced from a value greater than the width $w$ of the image 13 on the slit 14, the degree of modulation of the signal 20 decreases until when $q$ equals the modulation becomes zero or a low minimum value. As the grating 16 is further moved relative to the slit 14 to further reduce the value of $q$, the degree of modulation at the signal 20 increases again but in an opposite phase. The grating 16 is therefore moved along the XY axis until the value of $q$ is such that the degree of modulation of the signal 20 becomes zero or reaches a minimum value. The value of $q$ can be calculated from the geometry of the apparatus and as $q$ equals $w$ when the minimum value of modulation of the signal 20 is achieved, the value of $w$ and thereby the diameter of the rod 11 may be found.

FIGURE 4 shows a further modification. The arrangement is generally similar to that shown in FIGURES 1 and 2 except that the spatial frequency of the lines 17 moving across the slit 14 is varied by rotating the position of the axis of rotation 9 of the grating 16 about the point in the centre of the slit 14 thereby to vary the angle $\theta$ between the direction of the lines 17 and the length of the slit 14. The grating 16 is rotated at a constant speed about the axis 9, the velocity of rotation about the axis 9 being such as to provide a convenient frequency of modulation of the signal 20 from the photo-electric cell 19. In the example shown in FIGURE 4, the width of the slit 14 is equal to one quarter of the distance $p$ between the centres of adjacent lines 17 measured in a direction perpendicular to the lines 17.

In use of the example shown in FIGURE 4, the axis 9 of rotation of the grating is rotated about a point in the centre of the slit 14 thereby to alter the angle $\theta$ until a minimum value of the degree of modulation of the signal 20 is obtained. When this condition is met the width $w$ of the image 13 on the grating 14 equals $q$, the distance between the centres of adjacent lines 17 as seen in the slit 14, as was shown in connection with FIGURE 3, as $q$ equals $p/\sin \theta$ the value of $q$ may be calculated from the geometry of the apparatus and thereby give an measure of the diameter of the rod 11.

The apparatus shown in FIGURE 4 may alternatively be used as follows. The alternative photo-cell output circuit shown in FIGURE 5 is used wherein the output 20 of the photo-cell 19 passes through the filter 24 into the A.C. meter 26. The depth of modulation of the signal 20 may be read on the A.C. meter 26 when $\theta$ equals 0° (that is when $q$ equals infinity) and again the depth of modulation of the signal 20 may be measured for some previously selected value $\theta_1$, of the angle $\theta$. The width $w$ of the image 13, and thereby the diameter of the rod 11, may be determined from the ratio of the two values of the depth of modulation of the signal 20 obtained at the two angles $\theta_1$ and 0 degrees.

The general arrangement of mounting the grating 16 relative to the slit 14 as shown in FIGURE 4 may be generally similar to the structural arrangement of radial grating and associated mounting described, with reference to and illustrated in, FIGURE 16 of our patent specification No. 970,369.

In the examples described above the degree of modulation of the signal 20 from the photo-cell 19, is independent of variations in the energy input to the photocell 19 which might be caused, for example, by fluctuation in the temperature of the rod 11.

The invention is not restricted to the details of the foregoing examples.

For instance, the grating 16 may be placed in front of or behind the slit 14 provided that it is sufficiently close to the slit 14 that the image 13 is formed very near the plane of the grating 16.

The apparatus of the above examples of the invention may be used without modification to measure a linear dimension of a rod which absorbs the radiation and which partly screens the source of the radiation from the photoelectric cell in which case the image of the rod appears dark on a bright background.

As shown in FIGURE 6 it is possible to measure the various widths of a body having a number of different widths by using a separate scanner 16 (two of which are shown in FIGURE 6) and associated slit in a plate 15 (two of which are shown in FIGURE 6) for each width to be measured. An image of each object width is focused on each slit. The two scanners have different scanning frequencies so that the signal relating to each width of the object can be filtered out from the output signals of the electrical signal generating means 19 by means of a filter 27. Alternatively several separate instruments can be directed at the object each measuring one width or dimension of the object.

The apparatus of the invention may be used for reading a printed code consisting of a series of lines of different widths.

The apparatus may also be used to determine the distance from the measuring instrument of an object of a fixed width, since the width of the image formed is dependent on this distance.

I claim:

1. Apparatus for measuring a linear dimension of an object comprising a rotatable scanner having regions of differening degrees of responses to a beam of radiation from the object, which regions extend radially from the axis of rotation of the scanner, are regularly spaced, and have spatial frequency dependent upon the radial distance from the axis of rotation, means for rotating the scanner, imaging means for forming an image of the said linear dimension of the object on a selected part of the scanner so that when the scanner rotates the said regions at the said part of the scanner scan the image in the direction in which the linear dimension is to be measured to produce a modulated beam of radiation, the degree of modulation of which depends upon the relationship between the said dimension of the image and the spatial frequency of the regions scanning the image, a transducer responsive to the modulated beam of radiation for producing a modulated electrical signal from the modulated beam, and means for adjusting the positions of the axis of rotation of the scanner relative to the position of the image in a direction at right angles to the axis thereby to adjust the spatial frequency of the regions scanning the image.

2. Apparatus as claimed in claim 1 in which the adjusting means provides adjustment of the relative positions of the axis of rotation and the image in a direction towards and away from each other.

3. Apparatus as claimed in claim 1 in which the adjusting means provides adjustment of the relative positions of the axis of rotation and the image in a direction in which one rotates to a limited extent about the other.

4. Apparatus as claimed in claim 1 in which during adjustments the axis of rotation of the scanner is moved and the image forming means remains stationary.

5. Apparatus as claimed in claim 1 in which the image forming means includes a slit for limiting the dimension of the image in a direction at right angles to that in which the image is scanned.

6. Apparatus as claimed in claim 1 which includes a band pass filter for filtering the electrical signal.

7. Apparatus for measuring a linear dimension of an object comprising a rotatable scanner having alternate radiation transmitting and non-transmitting regions which extend radially from the axis of rotation of the scanner, are regularly spaced, and have spatial frequency dependent upon the radial distance from the axis of rotation, means for rotating the scanner, imaging means for forming an image of the said linear dimension of the object on a selected part of the scanner so that when the scanner rotates the said regions at the said part of the scanner scan the image in the direction in which the linear dimension is to be measured to produce a modulated beam of radiation, the degree of modulation of which depends upon the relationship between the said dimension of the image and the spatial frequency of the regions scanning the image, a transducer responsive to the modulated beam of radiation for producing a modulated electrical sgnal from the modulated beam, and means for adjusting the positions of the axis of rotation of the scanner relative to the position of the image in a direction at right angles to the axis thereby to adjust the spatial frequency of the regions scanning the image.

8. Apparatus as claimed in claim 7 in which the radiation transmitting and non-transmitting regions are all of equal width in the direction in which the linear dimension is to be measured.

9. Apparatus as claimed in claim 8 in which the rotatable scanner is radial grating.

10. Apparatus for measuring a number of linear dimensions of an object comprising a rotatable scanner for each dimension to be measured, the scanner having regions of differing degrees of response to the radiations, which regions extend radially from the axis of rotation of the scanner, are regularly spaced, and have spatial frequency dependent upon the radial distance from the axis of rotation, means for rotating the scanners, imaging means for forming an image of each dimension on a selected part of the associated scanner so that when each scanner rotates the said regions at the said part of each scanner scan the image in the direction in which the dimension is to be measured to produce a modulated beam of radiation, the degree of modulation of each beam depending upon the relationship between the dimension of the associated image and the spatial frequency of the regions scanning it, a transducer responsive to the modulated beams of radiation for producing a modulated electrical signal, the frequencies with which the regions of the scanners scan the image being different for each scanner and means for filtering from the electrical signal a signal associated with each scanner, and means for adjusting positions of the axis of rotation of each scanner relative to the position of the associated image in a direction at right angles to the axis thereby to adjust the spatial frequency of the regions scanning the image.

References Cited

UNITED STATES PATENTS

| | | | |
|---|---|---|---|
| 2,548,755 | 4/1951 | Vossberg et al. | 250—219 X |
| 3,097,298 | 7/1963 | Astheimer et al. | 250—219 X |
| 2,850,645 | 9/1958 | Chilton et al. | 250—219 |
| 3,162,712 | 12/1964 | Ingber | 88—14 |

WALTER STOLWEIN, *Primary Examiner.*

U.S. Cl. X.R.

250—233